Sept. 4, 1951    J. P. WHITAKER    2,566,646
COMBINATION BATTERY TERMINAL AND CABLE
AND METHOD OF PRODUCING THE SAME
Filed Sept. 29, 1947

INVENTOR.
Jack P. Whitaker

BY
ATTORNEYS.

Patented Sept. 4, 1951

2,566,646

UNITED STATES PATENT OFFICE 2,566,646

COMBINATION BATTERY TERMINAL AND CABLE AND METHOD OF PRODUCING THE SAME

Jack P. Whitaker, Kansas City, Mo., assignor to Whitaker Cable Corporation, North Kansas City, Mo., a corporation of Delaware Application September 29, 1947, Serial No. 776,812

2 Claims. (Cl. 219—10)

This invention has to do with a combination battery terminal, or other fitting, and cable and to the method of joining the same through flash-weld process.

The most important object of this invention is to provide a combination battery terminal and cable having a sleeve circumscribing one end of the cable and press-fitted thereon in tight engagement with the cable, the sleeve being attached to the battery terminal by flash-welding.

An important object of this invention is the provision of a combination battery terminal and cable having a sleeve provided with an external raised portion intermediate the ends thereof, serving to present an internal projection or rib within the sleeve for gripping the cable when said sleeve is moved into a drawing die.

Another important object of this invention is the provision of a combination battery terminal and insulated cable having a portion of the insulation thereof removed from one of its ends, the cable and a portion of the insulation remaining thereon being inserted into a sleeve for gripping engagement thereby prior to flash-welding the sleeve upon the battery terminal.

Other objects of this invention include the manner in which an external rib is formed upon the cable receiving sleeve for gripping the insulation remaining thereon and extending into the sleeve; the way in which an internal shoulder is formed in the sleeve for receiving one end of the insulation in abutting relationship thereon; the manner in which the flash-welding fuses together the cable end and sleeve, and the cable end and sleeve with the battery terminal; and the way in which in a modified form thereof, a concave edge is formed on the battery terminal for presenting a straight line of weld when the sleeve is flash-welded therewith.

Many additional objects will be made clear during the course of the following specification, reference being had to the accompanying drawing, wherein.

Figure 1:
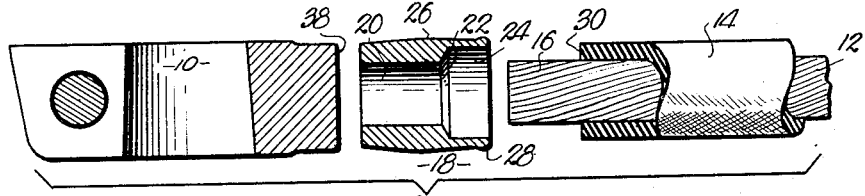
Fig. 1 is a fragmentary side elevational view of a combination battery terminal and cable made in accordance with my present invention, parts being broken away and in section to reveal details of construction.

Many different forms of cables and end fitting therefor have heretofore been made and through various methods of manufacture but for the most part none have been satisfactory because of the tendency of the cable separating from the fitting after the same is placed into use.

The most common procedure for attaching a metallic cable to a fitting is by welding, particularly butt welding and oftentimes a sleeve of one character or another is placed upon the cable to prevent damage thereto during the process of welding. The particular purpose of placing a sleeve on the cable in such fashion is to prevent a flaring or spreading out of the individual wires of the cable due to the welding process. This type of cable is not satisfactory however, because only a relatively tight fit is presented between the sleeve and the cable and the weld is incapable of preventing the cable from being separated from the end fitting and from the sleeve.

The fitting chosen for illustration in the accompanying drawing constitutes a conventional clamp broadly designated by the numeral 10 and designed to engage with a battery post. It is understood however, that any fitting may be affixed to a cable in the manner about to be described other than this specific type of battery terminal 10. In the modification shown in Figs. 1 to 4 inclusive, the cable 12 constitutes a number of wound individual wires and is substantially cylindrical. This cable 12 is provided with insulation 14 in the usual manner and the first step in the manufacture of the combination forming the subject matter of this invention, is to remove a porttion of the insulation 14 from one end of the cable 12, leaving a barren end 16 of the cable 12.

This end 16 of the cable 12 and a portion of the insulation 14 remaining upon cable 12 is then inserted into a sleeve broadly designated by the numeral 18. This sleeve 18 has an internal bore therethrough having a portion 20 at one end thereof of uniform diameter throughout its length. This portion 20 terminates intermediate the ends of sleeve 18 in a beveled shoulder 22. Another portion 24 of the internal bore of sleeve 18 is of slightly greater diameter than the portion 20 thereof and this part 24 of the internal bore is also of uniform diameter throughout its length. The external surface of the sleeve 18 progressively increases in outside diameter from one end thereof to present a raised portion 26 intermediate the ends of the sleeve 18.

This raised portion 26 is substantially the same throughout the circumference of the sleeve 18 and when the end 16 of the cable 12 is placed within the sleeve 18, this portion 26 is in circumscribing relationship thereto.

Figure 2:
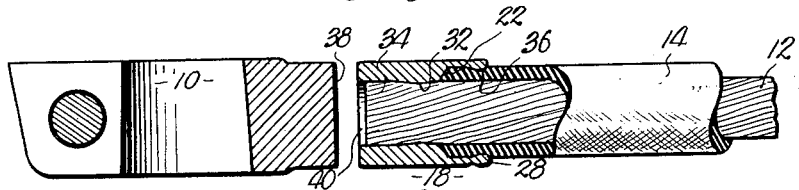
Fig. 2 is a fragmentary side elevational view showing the same in a partially assembled condition and prior to flash-welding, parts being broken away for clearness.
Figure 3:
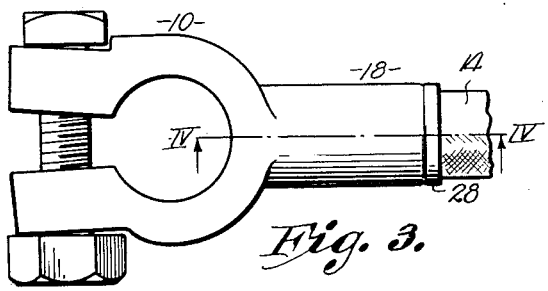
Fig. 3 is a fragmentary side elevational view of the completed combination battery terminal and cable.
Figure 4:
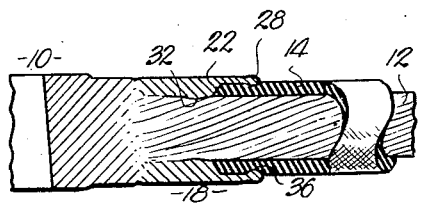
Fig. 4 is a fragmentary cross sectional view taken on line IV—IV of Fig. 3.
Figure 5:
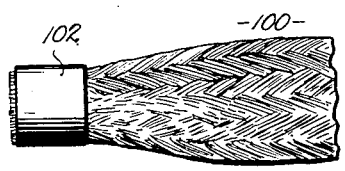
Fig. 5 is a side elevational view of a modified form of the present invention showing the cable and sleeve thereon after the first step in the making of the same.
Figure 7:
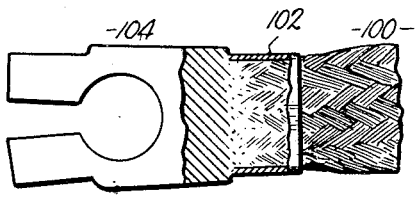
Fig. 7 is a fragmentary side elevational view thereof after completion, parts being broken away for clearness.

An external annular rib 28 is also formed on the sleeve 18 near one end thereof adjacent the portion 24 of the internal bore of sleeve 18. This rib 28 lies in circumscribing relationship to a portion of the insulation 14 when the cable 12 is inserted in the sleeve 18. It is thus seen that the second step in the manufacture of the device is to insert cable 12 in sleeve 18 where the barren portion 16 is disposed within the portion 20 of the internal bore of sleeve 18 and the insulation 14 lies in abutting relationship to the internal shoulder 22, as clearly illustrated in Fig. 2. This figure also shows the way in which a portion of the insulation 14 is disposed within that portion 24 of sleeve 18. Only a predetermined amount of the insulation 14 is removed from the cable 12 to the end that when the end 30 of insulation 14 moves against the shoulder 22, the free end of the portion 16 of cable 12 will terminate a relatively short distance from one end of the sleeve 18. The next step in the process of manufacture after the sleeve 18 has been placed upon the cable 12 as above described, is to move the sleeve 18 into a conventional drawing die. This drawing die includes a head having a bore thereto of uniform diameter, said diameter being but slightly larger than the outside diameter of the sleeve 18 adjacent the end thereof opposite to the rib 28. When this sleeve is moved through the drawing die, the raised portion 26 will be pressed inwardly and evenly throughout the periphery of sleeve 18, as will the rib 28, to a point where the entire length of the sleeve 18 will be of substantially the same outside diameter. Thus, after the sleeve 18 has moved into the drawing die, the same will appear as illustrated in Fig. 2.

This inward pressure upon the raised portion 26 and upon the rib 28 of the sleeve 18 will present an internal projection or rib 32 within the sleeve 18 and within the portion 20 of the internal bore relatively close to the internal shoulder 22 thereof. This projection 32 will tightly grip the portion 16 of the cable 12 causing the end thereof to flare outwardly as at 34. This tight gripping action of the annular internal rib 32 upon the cable 12 and the outward flaring thereof as at 34, will positively prevent removal of sleeve 18 from the cable 12 when placed in use. By the same token, the inward pressure upon the rib 28 will create an annular internal rib or projection within the portion 24 of the bore through sleeve 18 as at 36. This rib 36 will grip that portion of the insulation 14 within the sleeve 18 and not only aid in preventing removal of the cable 12 from the sleeve 18 but will prevent unravelling of the insulation 14 adjacent the sleeve 18.

The final step in the manufacture of the battery terminal and cable is to place the free end of the sleeve 18 into abutting relationship with one edge 38 of the terminal 10 and to flash-weld the same together. This flash-weld will melt the portion 40 of the sleeve 18 extending beyond the outermost end of the cable 12 and fuse this outermost end of cable 12 in abutting relationship with the edge 38 of the terminal 10. In addition, the flared end 34 of the cable 12 will be fused with the sleeve 18 and sleeve 18 will fuse tightly with the end 38 of terminal 10. The manner in which the flared end 34 of cable 12, the sleeve 18 and the battery terminal 10 are all fused together into practically an integral molding, is clearly illustrated by the sectional view shown in Fig. 4.

It is readily understood from the foregoing that a combination battery terminal and cable is presented wherein the flash-weld not only has no harmful effect whatsoever upon the twisted end of the cable 12 but is utilized to create a much more sturdy and durable attachment. There is no possibility whatsoever of the sleeve 18 becoming detached from the terminal 10 and cable 12 cannot be pulled outwardly from the sleeve 18 because of three distinct means of attachment.

One of these means constitutes the internal rib 32 gripping the cable 12, another is the rib 36 grasping tightly the insulation 14 and finally, the flared end 34 of the cable 12 is held in such flared relationship so that the same will not pass the rib 32 by the flash-welding process and the melting of the portion 40 of sleeve 18 therewith into a hard molding mass.

The modification shown in Figs. 5 to 8 inclusive, includes a relatively flat woven metallic cable broadly designated by the numeral 100. The first step in the formation of the device forming the subject matter of this modification is to place a substantially cylindrical metallic sleeve 102 upon the cable 100. The method of placing the sleeve 102 upon the cable 100 forms no part of this invention and may be accomplished by placing one end of the cable 100 into a die that is hollow and frusto-conical in shape whereby to fold this end of the cable 100 into a slightly rounded condition where the same will readily receive the cylindrical sleeve 102.

Figure 6:
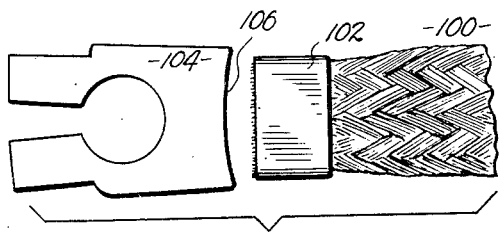
Fig. 6 is a stretched-out view thereof showing the article in the second stage of its manufacture.
Figure 8:
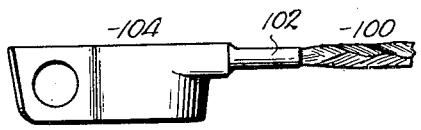
Fig. 8 is a fragmentary edge elevational view of the completed article.

The second step in the manufacture is to press the sleeve 102 in a flat condition as illustrated in Fig. 6. This step may be accomplished in any number of ways but the sleeve 102 should be pressed into tight gripping relationship with the cable 100. The battery terminal 104 in this instance has a concave edge 106 for receiving the sleeve 102 and the cable 100 in abutting relationship therewith. These parts are then flash-welded in the same manner as above described with respect to the modification shown in Figs. 1 to 4 inclusive.

This flash-welding step will fuse the end of the uninsulated cable 100 tightly within the sleeve 102 and also fuse sleeve 102 and the cable 100 with the terminal 104. By forming the edge of terminal 104 which receives the cable 100 as at 106, a straight line of weld is presented across the terminal 104 and the sleeve 102 substantially parallel with the edges of this sleeve 102. In the absence of forming this concave edge 106, the line of weld is arcuate because of the tendency of fusing together more quickly at the outermost ends of the sleeve 102, leaving an unsatisfactory weld intermediate the ends of the sleeve 102 and of the terminal 104. By forming this arcuate edge 106 on the terminal 104, the line of weld is uniform and of like strength entirely across the sleeve 102 and the edge 106 of terminal 104.

While only two modifications of my present invention have been illustrated and described, it is realized that many additional variations in the method of manufacturing the same and in the device itself, may be utilized without departing from the spirit of this invention or scope of the appended claims.

Having thus described the invention, what is claimed as new and desired to be secured by Letters Patent is:

1. The method of attaching a metallic cable to a metal fitting which comprises the steps of enclosing a part of the cable adjacent one end thereof in a metallic sleeve with a portion of said sleeve extending outwardly beyond said part of the cable; pressing said sleeve into tight frictional engagement with said part of the cable; holding said one end of the sleeve in abutting relationship with the fitting to form a pocket defined by the end of the cable, said fitting, and the metallic sleeve; and then melting the extending portion of the sleeve by flash welding to cause the material thereof to flow into said pocket and thereby fuse together the cable, said sleeve, and the fitting.

2. The method of attaching metallic, stranded cable to a metal fitting which comprises the steps of enclosing a part of the cable adjacent one end thereof in a metallic sleeve with a portion of said sleeve extending outwardly, longitudinally beyond said part of the cable; pressing said sleeve into tight frictional engagement with said part of the cable along a line circumscribing the cable and spaced inwardly from said one end thereof to flare the end of the cable and to form spaces between the strands thereof; holding said one end of the sleeve in abutting relationship with the fitting to form a pocket defined by the end of the cable, said fitting, and the metallic sleeve; and then melting the extending portion of the sleeve by flash welding to cause the material thereof to flow into said pocket and into the said spaces between the strands at the aforesaid flared end of the cable to thereby fuse together the cable, said sleeve, and the fitting.

JACK P. WHITAKER.

REFERENCES CITED

The following references are of record in the file of this patent:

UNITED STATES PATENTS

| Number | Name | Date |
| --- | --- | --- |
| 650,862 | McTighe | June 5, 1900 |
| 1,758,218 | Carlson | May 13, 1930 |
| 1,916,574 | Key | July 4, 1933 |
| 1,977,846 | Febrey | Oct. 23, 1934 |
| 2,008,227 | Reilly | July 16, 1935 |
| 2,008,787 | Febrey | July 23, 1935 |
| 2,226,849 | Douglas | Dec. 21, 1940 |
| 2,304,194 | Payne | Dec. 8, 1942 |
| 2,480,280 | Bergan | Aug. 30, 1949 |

FOREIGN PATENTS

| Number | Country | Date |
| --- | --- | --- |
| 210,271 | Switzerland | Sept. 16, 1940 |